July 1, 1924.
A. BADOWSKI
PRESSURE GAUGE FOR TIRES
Filed Jan. 22, 1921
1,499,328
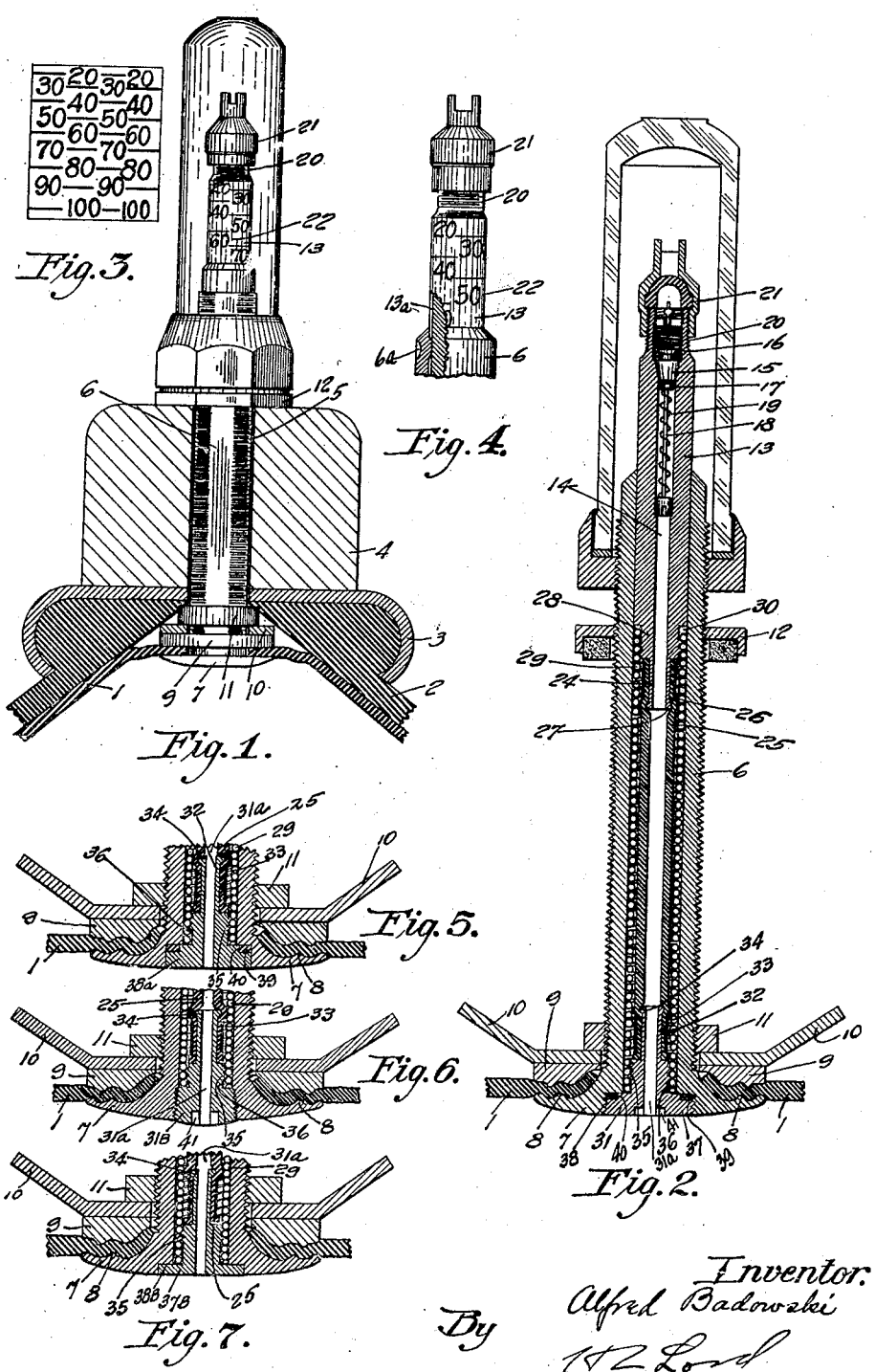
Inventor:
Alfred Badowski
By H.Z. Lord
Attorney.

Patented July 1, 1924.

1,499,328

UNITED STATES PATENT OFFICE.

ALFRED BADOWSKI, OF CHARLESTON, WEST VIRGINIA, ASSIGNOR, BY MESNE ASSIGNMENTS, TO TIREGAGE VALVE CORPORATION, OF CHARLESTON, WEST VIRGINIA, A CORPORATION OF WEST VIRGINIA.

PRESSURE GAUGE FOR TIRES.

Application filed January 22, 1921. Serial No. 439,065.

*To all whom it may concern:*

Be it known that I, ALFRED BADOWSKI, a citizen of the United States, residing at Charleston, in the county of Kanawha and State of West Virginia, have invented new and useful Improvements in Pressure Gauges for Tires, of which the following is a specification.

This device is designed for registering pressure in receptacles such as pneumatic tires. It is important that the device be as small as possible so that it may be used as a tire stem and pass through the standard openings in felloes. It is also desirable that the device be leak-proof and cheaply constructed and that variations of pressure be readily observable. The present structure has these desirable qualities as well as other features of invention.

In the drawings:—

Fig. 1 shows a section through a wheel rim with the device in place.

Fig. 2 a central section through the pressure device.

Fig. 3 a development of the scale surface.

Fig. 4 a view showing an alternative construction.

Figs. 5, 6 and 7 sectional views showing alternative constructions.

1 marks an inner tube, 2 a tire, 3 a wheel rim, 4 a felloe, and 5 a valve stem opening through the felloe. The pressure gauge is carried by the stem or sleeve 6 which extends through the opening 5. The stem has a head 7 with corrugations 8 on its face. The tube 1 is clamped between this corrugated head and a corrugated washer 9. A spreader 10 rests on the washer 9 and the parts are secured by a nut 11. A nut 12 secures the stem in the felloe.

A plunger 13 having a central passage 14 is slidingly and rotatably mounted in the sleeve. An inside valve 15 is screwed into the portion 16 of the passage 14. The active element 17 of the valve checks an outflow of air and has the guide stem 18 and is actuated by a spring 19. The plunger has the usual screw threads 20 for a pump connection, these screw threads also serving to secure the usual cap 21.

The plunger has a scale 22 indicating the pressure to which the plunger is subjected. The numerals on the scale are staggered so that they may be made larger. The plunger as shown in Fig. 2 is free to rotate in the sleeve, thus making a smaller size of sleeve possible and simplifying the construction but making the position of the scale uncertain. The scale, therefore, is carried entirely around the plunger so that it may be observed from opposite sides of the plunger.

The plunger has a stepped extension, one step 24 receiving a rubber tube 25, the tube being secured by a wrapping 26, a shoulder 27 at the end of the step 24 aiding in securing the tube. The larger step 28 is screw-threaded and a spring 29 screwed on to these screw threads. A space 30 between the screw and the plunger permits the adjustment of the spring so that different springs may be adjusted to compensate for variations. An anchor piece 31 is inserted from the inner end of the sleeve opening. The anchor piece has a stepped extension. The rubber tube 25 is secured on the smaller step 32 by a wrapping 33, the step having a shoulder 34 at its end to aid in securing the tube. The larger step has a screw 35 into which the lower end of the spring is screwed to secure the spring to the anchor piece. The larger step has a space 36 below the screw 35 to permit of adjusting the spring. The anchor piece has a closure plate 37 which is screwed into a screw-threaded socket 38 at the inner end of the head. The closure plate seats on a gasket 39. The gasket seats on the base of the socket and is confined by a shoulder 40 on the anchor piece so that as the closure plate is screwed into place a perfect seal is made and the engagement of the gasket tends to lock the anchor piece in place. The anchor piece has a wrench-hold 41 and is provided with a passage 31$^a$ through which air passes to the tube.

The screws 28 and 35 have the same direction of pitch as the screw 20. The twisting force on the plunger through action on the screw 20, therefore, expands the spring 29 into engagement with the sleeve, thus locking further turning of the plunger. The plunger may, however, be positively locked against turning in the manner shown in Fig. 4 wherein the plunger has a key-way 13$^a$ and the sleeve is indented to form a key 6$^a$. The key may thus be formed after the parts are assembled.

In the alternative construction shown in

Fig. 5 the closure plate 38ᵃ is pressed into the socket 38, the structure being otherwise similar to that of Fig. 2.

In Fig. 6 the sleeve opening continues with uniform diameter through the head, the inner end of the opening being screw-threaded and the anchor piece 31ᵇ screwed into place, a sealing cement being used on the threads to assure a complete closure.

In the construction shown in Fig. 7 the closure plate 37ᵇ is forced into the socket 38ᵇ, the gasket being omitted.

In operation air is pumped through the valve in the plunger to the tire. As the pressure in the tire increases the plunger is forced outwardly and the pressure is indicated by the scale.

What I claim as new is—

In a pressure gauge for tires, the combination with a tire stem of a plunger in the stem indicating by its position the pressure in the tire; a spring secured to the inner end of the plunger; a rubber tube secured to the inner end of the plunger; and a head on the inner end of the stem, the stem and head having aligned openings, of an anchor piece insertable into the inner end of the openings and forming a closure for said openings, said anchor piece having a nipple for securing the tube and a shoulder for securing the inner end of the spring.

In testimony whereof I have hereunto set my hand.

ALFRED BADOWSKI.